US012687218B2

(12) United States Patent
Goossens et al.

(10) Patent No.: US 12,687,218 B2
(45) Date of Patent: Jul. 21, 2026

(54) SEMI-POWERSHIFT DOG CLUTCH TRANSMISSION

(71) Applicant: Dana Belgium N.V., Bruges (BE)

(72) Inventors: Stijn Goossens, Erpe-Mere (BE); Filip Van Raepenbusch, Bruges (BE); Filip D. Schacht, Meulebeke (BE); Kurt Cattoor, Koolkerke (BE)

(73) Assignee: DANA BELGIUM, Bruges (BE)

( * ) Notice: Subject to any disclaimer, the term of this patent is extended or adjusted under 35 U.S.C. 154(b) by 0 days.

(21) Appl. No.: 19/096,467

(22) Filed: Mar. 31, 2025

(65) Prior Publication Data

US 2025/0314287 A1        Oct. 9, 2025

Related U.S. Application Data

(60) Provisional application No. 63/575,399, filed on Apr. 5, 2024.

(51) Int. Cl.
| | |
|---|---|
| *F16H 3/093* | (2006.01) |
| *B60K 1/02* | (2006.01) |
| *B60K 17/08* | (2006.01) |
| *B60K 17/28* | (2006.01) |
| *F16H 3/08* | (2006.01) |

(52) U.S. Cl.
CPC .............. *F16H 3/093* (2013.01); *B60K 1/02* (2013.01); *B60K 17/08* (2013.01); *B60K 17/28* (2013.01); *F16H 2003/0818* (2013.01); *F16H 2200/0021* (2013.01); *F16H 2200/0039* (2013.01)

(58) Field of Classification Search
CPC ............. F16H 3/093; F16H 2003/0818; F16H 2200/0021; F16H 2200/0039; F16H 2061/0422; F16H 3/126; F16H 37/065; F16H 61/0403; B60K 1/02; B60K 17/08; B60K 17/28
See application file for complete search history.

(56) References Cited

U.S. PATENT DOCUMENTS

| | | | | |
|---|---|---|---|---|
| 2025/0198484 A1* | 6/2025 | Coenen | .................. | B60K 17/08 |
| 2025/0198509 A1* | 6/2025 | Van Dingenen | ....... | B60K 17/04 |
| 2026/0078820 A1* | 3/2026 | Goossens | .............. | F16H 61/688 |

OTHER PUBLICATIONS

Goossens, S. et al., "System and Method for Transmission Shifting," U.S. Appl. No. 18/887,408, filed Sep. 17, 2024, 28 pages.

* cited by examiner

*Primary Examiner* — Terence Boes
(74) *Attorney, Agent, or Firm* — McCoy Russell LLP

(57) ABSTRACT

A transmission system, comprising: a first section, comprising a plurality of first gearsets and at least a first non-friction clutch; a second section, comprising a plurality of second gearsets and a plurality of second non-friction clutches; a third section, comprising a plurality of third gearsets and a plurality of third non-friction clutches; and a plurality of movers configured to selectively couple and drivingly couple to one or more of the first gearsets via the first non-friction clutch, where the second non-friction clutches selectively couple and drivingly couple the second gearsets via powershifting, and where the third non-friction clutch selectively couple and drivingly couple third gearsets via a non-powershifting gearshift.

20 Claims, 5 Drawing Sheets

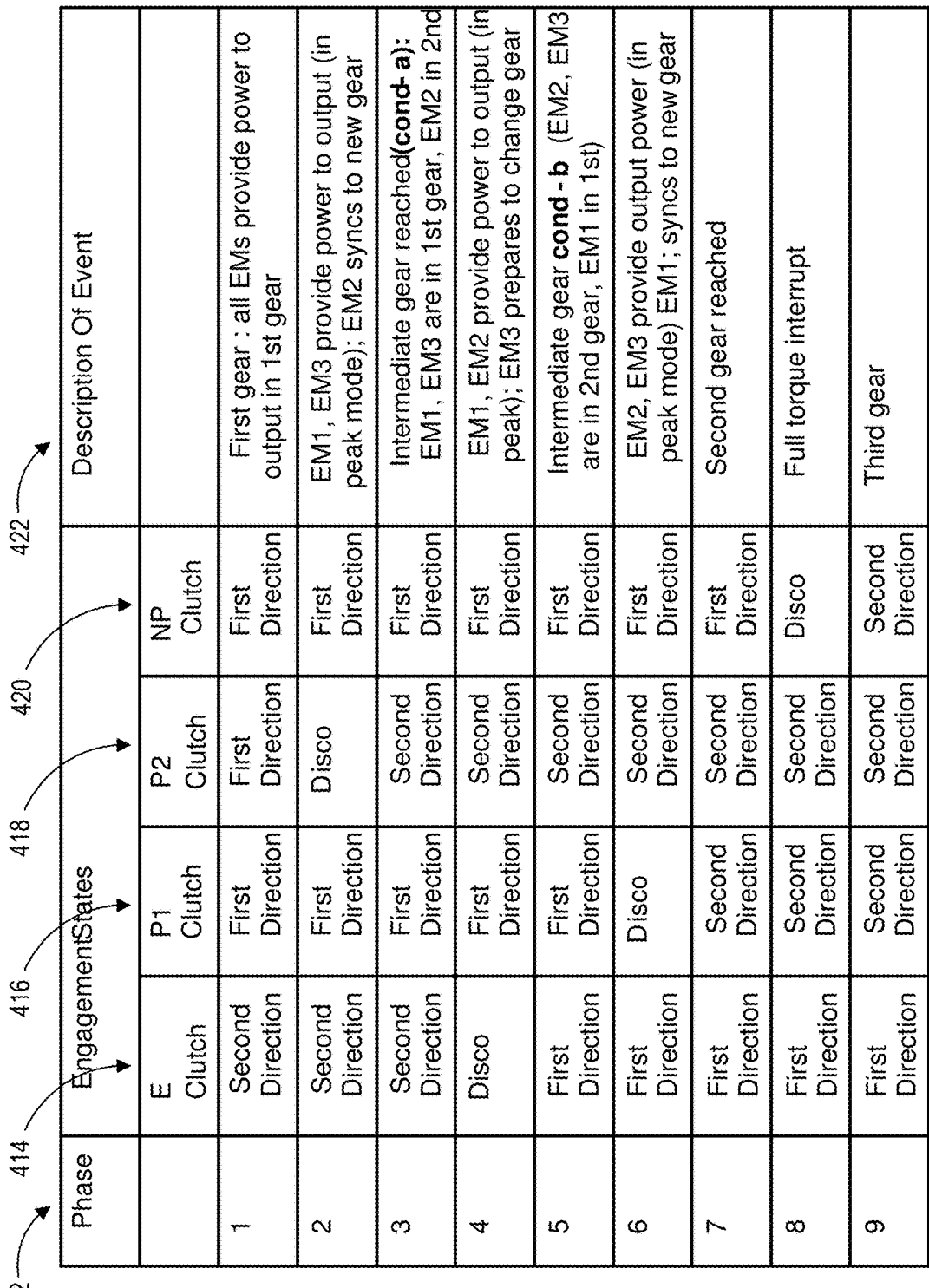

| Phase | Engagement States | | | | Description Of Event |
|---|---|---|---|---|---|
| | E Clutch | P1 Clutch | P2 Clutch | NP Clutch | |
| 1 | Second Direction | First Direction | First Direction | First Direction | First gear : all EMs provide power to output in 1st gear |
| 2 | Second Direction | First Direction | Disco | First Direction | EM1, EM3 provide power to output (in peak mode); EM2 syncs to new gear |
| 3 | Second Direction | First Direction | Second Direction | First Direction | Intermediate gear reached(cond-a): EM1, EM3 are in 1st gear, EM2 in 2nd |
| 4 | Disco | First Direction | Second Direction | First Direction | EM1, EM2 provide power to output (in peak); EM3 prepares to change gear |
| 5 | First Direction | First Direction | Second Direction | First Direction | Intermediate gear cond-b (EM2, EM3 are in 2nd gear, EM1 in 1st) |
| 6 | First Direction | Disco | Second Direction | First Direction | EM2, EM3 provide output power (in peak mode) EM1; syncs to new gear |
| 7 | First Direction | Second Direction | Second Direction | First Direction | Second gear reached |
| 8 | First Direction | Second Direction | Second Direction | Disco | Full torque interrupt |
| 9 | First Direction | Second Direction | Second Direction | Second Direction | Third gear |

SEMI-POWERSHIFT DOG CLUTCH TRANSMISSION

CROSS REFERENCE TO RELATED APPLICATIONS

The present application claims priority to U.S. Provisional Application No. 63/575,399, entitled "SEMI-POWER-SHIFT DOG CLUTCH TRANSMISSION", and filed on Apr. 5, 2024. The entire contents of the above-listed application are hereby incorporated by reference for all purposes.

TECHNICAL FIELD

The present description relates to a transmission capable of performing a powershift in a certain output speed range via non-friction clutches.

BACKGROUND AND SUMMARY

During operations of a vehicle, such as an electrified vehicle, it may be desired to have powershifting transmission operation. Friction clutches may be used to enable powershifting for both upshifting and downshifting. An electrified vehicle, including fully electric vehicles (FEVs) or hybrid vehicles, may have multiple inputs of torque to the transmission, such as via a plurality of electric motors.

However, using friction clutches has the disadvantage of the disengagement causing clutch drag. Clutch drag may also place stress and strain on rotational elements of the transmission, such as gears of gearsets, shafts, and the friction clutches, which may cause or increase degradation to the rotational components. In an electrified vehicle, clutch drag and other forms drag of the transmission may be more pronounced at higher rotational speeds that may be generated via electric machines compared to an internal combustion engine (ICE). Additionally, at higher speeds, friction clutches, such as wet clutches, may require additional lubrication and/or cooling with lubricant. The increase in fluid may increase splashing and clutch drag, further increasing power losses. As an alternative to friction clutches, non-friction clutches (e.g., on/off style clutches) may be used for reducing clutch drag and power losses to the transmission at higher speeds. However, traditional configurations of transmissions may be unable to powershift using non-friction clutches.

The inventors have recognized these and other issues with such systems. As developed in one example is a transmission system, comprising: a first section, comprising a plurality of first gearsets and at least a first non-friction clutch; a second section, comprising a plurality of second gearsets and a plurality of second non-friction clutches; a third section, comprising a plurality of third gearsets and a plurality of third non-friction clutches; and a plurality of movers configured to selectively couple and drivingly couple one or more of the first gearsets via the first non-friction clutch, where the plurality of second non-friction clutches selectively couple and drivingly couple the second gearsets via powershifting, and where the plurality of third non-friction clutches selectively couple and drivingly couple third gearsets without powershifting.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIG. 4 shows a table of gear states and a method for shifting gears of the example transmission systems of FIGS. 2-3.

DETAILED DESCRIPTION

Figure 1:
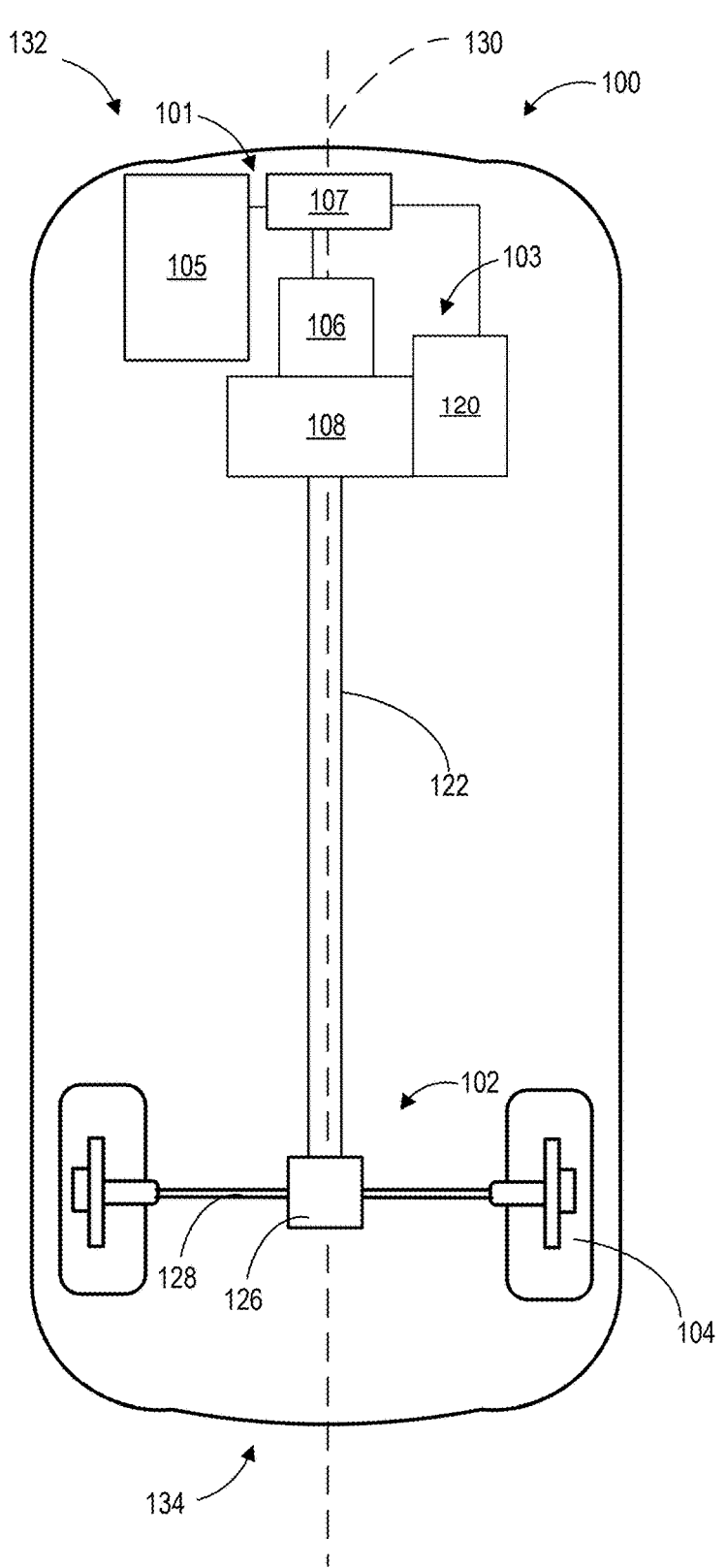
FIG. 1 shows an example schematic of a vehicle which may include a transmission of the present disclosure.

The following description relates to a transmission system including a transmission capable of at least partial power-shifting with non-friction clutches (e.g., on/off style clutches). The non-friction clutches may include dog clutches. Powershifting is the process of shifting between two gearsets of different ratios (e.g., speeds) without loss of output torque. When powershifting, gears are shifted to a different gear state of a transmission while not removing input from an acceleration device, such as an accelerator pedal. During powershifting operations when shifting gear states in the transmission, a clutch may be shifted in a direction to engage (e.g., depressed) while the shift lever is shifted from a first gear to a second gear, keeping a mover outputting in the same power band. During non-powershift-ing operations, when shifting gear states of a transmission the shift lever is shifted from a first gear to a second gear before the clutch is shifted in the direction to engage. Powershifting may be completed for both upshifting (e.g., shifting from a gear state of a lower ratio to a gear state of a higher ratio) or downshifting (e.g., shifting from a gear state of a higher ratio to a gear state of a lower ratio). Powershifting may reduce time where the wheels are unpowered or less powered than a prior state, as the mover may provide the same torque and rotational speed to the clutch during shifting. In some layouts of the transmission, torque may be delivered to an output of the transmission while shifting gear states via powershifting. Powershifting may alternatively be referred to as full-throttle shifting and flat-shifting. A layout for a transmission of the present disclosure may powershift for specific gearsets and power-flows, and may not powershift for specific other gearsets and other power-flows.

The transmission system comprises a first section, a second section, and a third section. The first section is a mover swapping section, where movers of a vehicle housing the transmission system may be selectively coupled to one or more of a plurality of first gearsets to transfer rotational energy into the transmission. The first section may be an electric machine swapping section, where the movers are electric machines, such as electric motors or electric motors/generators. The first section may include at least a first non-friction clutch to selectively couple input shafts to one or more of a plurality of first gearsets. The second section is a powershifting section, where one or more of a plurality second gearsets may be selectively coupled via powershift-ing. Powershifting and other selective coupling to the second gearsets may be performed via shifting a plurality of second non-friction clutches of the second section. The third section is a non-powershifting section, where one or more of a plurality of third gearsets may be selectively coupled without powershifting. The selective coupling to the third gearsets may be performed via shifting one or more of a plurality of third clutches of the third section.

The transmission may optionally include a fourth section, where the fourth section includes a power take off (PTO) system, which may be referred to herein as a PTO assembly. The PTO assembly may include a PTO gearset and a PTO implement. A power-flow may travel from a mover through the PTO gearset and to the PTO implement. The torque of rotational energy from a mover may be modified, such as being increased or decreased, by PTO gearset to drive the PTO implement. The PTO implement may drive and/or be part of a PTO device, such as a pump or a drill.

Additionally, the following description relates method of transitioning between a first gear, a second gear, and a third gear of the transmission via the non-friction clutches of the transmission system. The method is a method of upshifting from a first gear to a third gear of a higher ratio relative to the first gear. The method is shown via a table of conditions, where the clutches of the transmission may be transition between plurality states to transition between phases of the method. Conditions shown at each phase via the table include the state of the clutches of the transmission system.

Compared to other powershift layouts for a transmission using on/off clutches, the layout of the transmission of the present disclosure may allow for powershifting using dog clutches or other on/off style clutches (e.g., non-friction clutches), but extend the range of rotational speed and increase the power usage of electric machines via the non-powershifting section of the transmission. To extend the range of rotational speed and increase power usage, the transmission may be shifted to another gear via the third section. Additionally, two electric machines may operate when shifting between gears, such that in a peak mode no power drop occurs during shifting between gears. Further, a powershifting layout may have approximately symmetric gear ratios where the first electric machine, the second electric machine, and the third electric machine may provide traction in approximately the same gear whether in the first gear, the second gear, or the third gear. Alternatively, the gear ratios of the first section may be made slightly asymmetric to increase power at a maximum speed when the transmission is shifted to output in third gear compared to the first gear, or vice versa.

Figure 2:
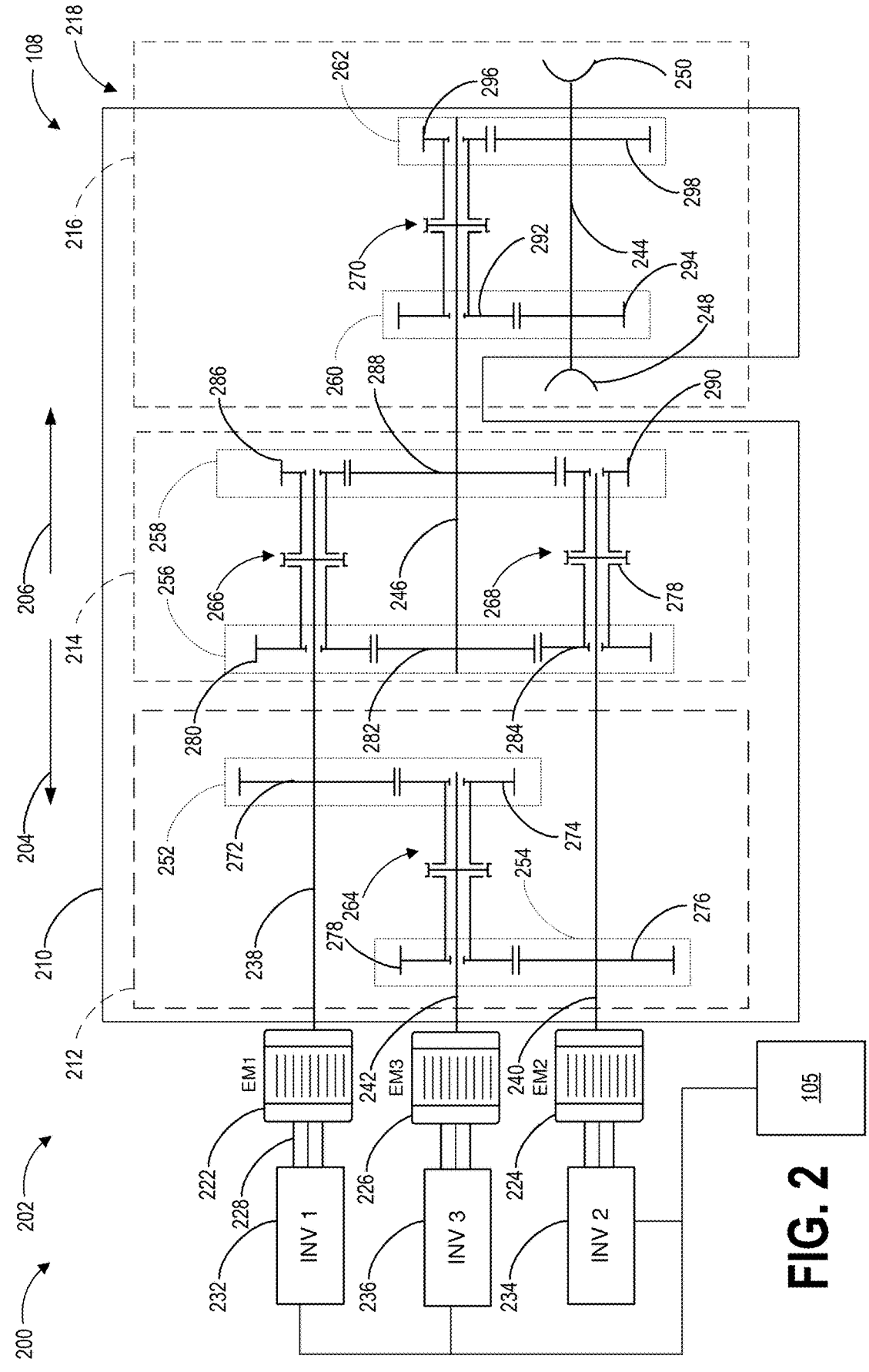
FIG. 2 shows a first example schematic of a transmission system of the present disclosure.
Figure 3:
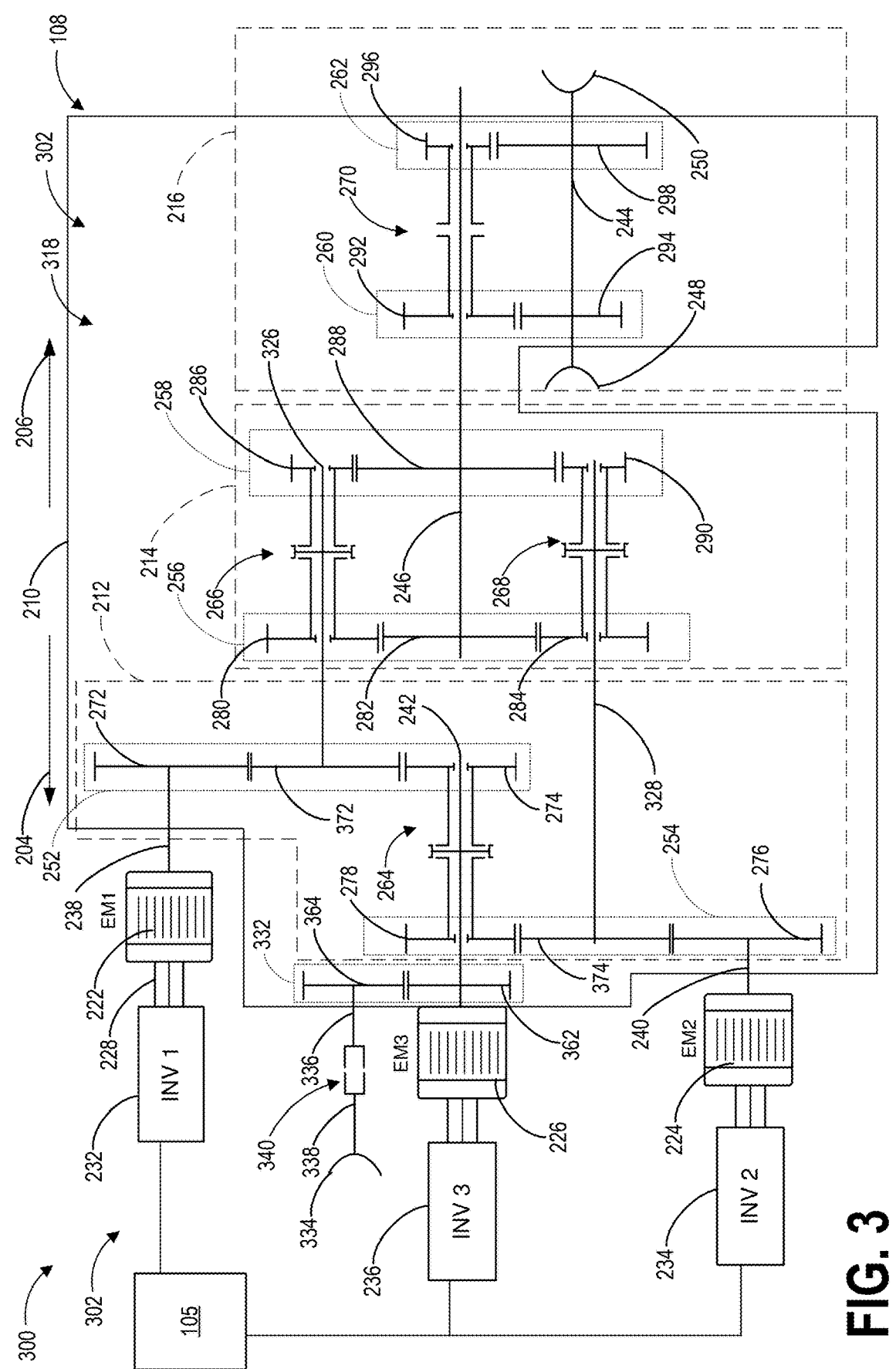
FIG. 3 shows a second example schematic of a transmission system of the present disclosure.

FIG. 1 shows an example schematic of a vehicle, which may include a transmission of the present disclosure. FIG. 2 shows a schematic of a first example schematic of a transmission system of the present disclosure. FIG. 3 shows a schematic of second example of a transmission system of the present disclosure. FIG. 2 and FIG. 3 show a transmission system divided into the electric machine swapping section, a powershift section where powershifting may be performed between gearsets, and a non-powershift section where powershifting may not be performed between gearsets. The second example in FIG. 3 includes a PTO assembly and modifications to the gearsets compared to the first example. FIG. 4 shows a table of gear states and a method for shifting gears of the example transmission systems of FIGS. 2-3. The table of FIG. 4 shows the states of the non-friction clutches during each phase of the method and each gear that may be selected by the transmission system. The table of FIG. 4 is for a method where the transmission of the present disclosure has a non-powershifting section with two gear states.

Figure 5:
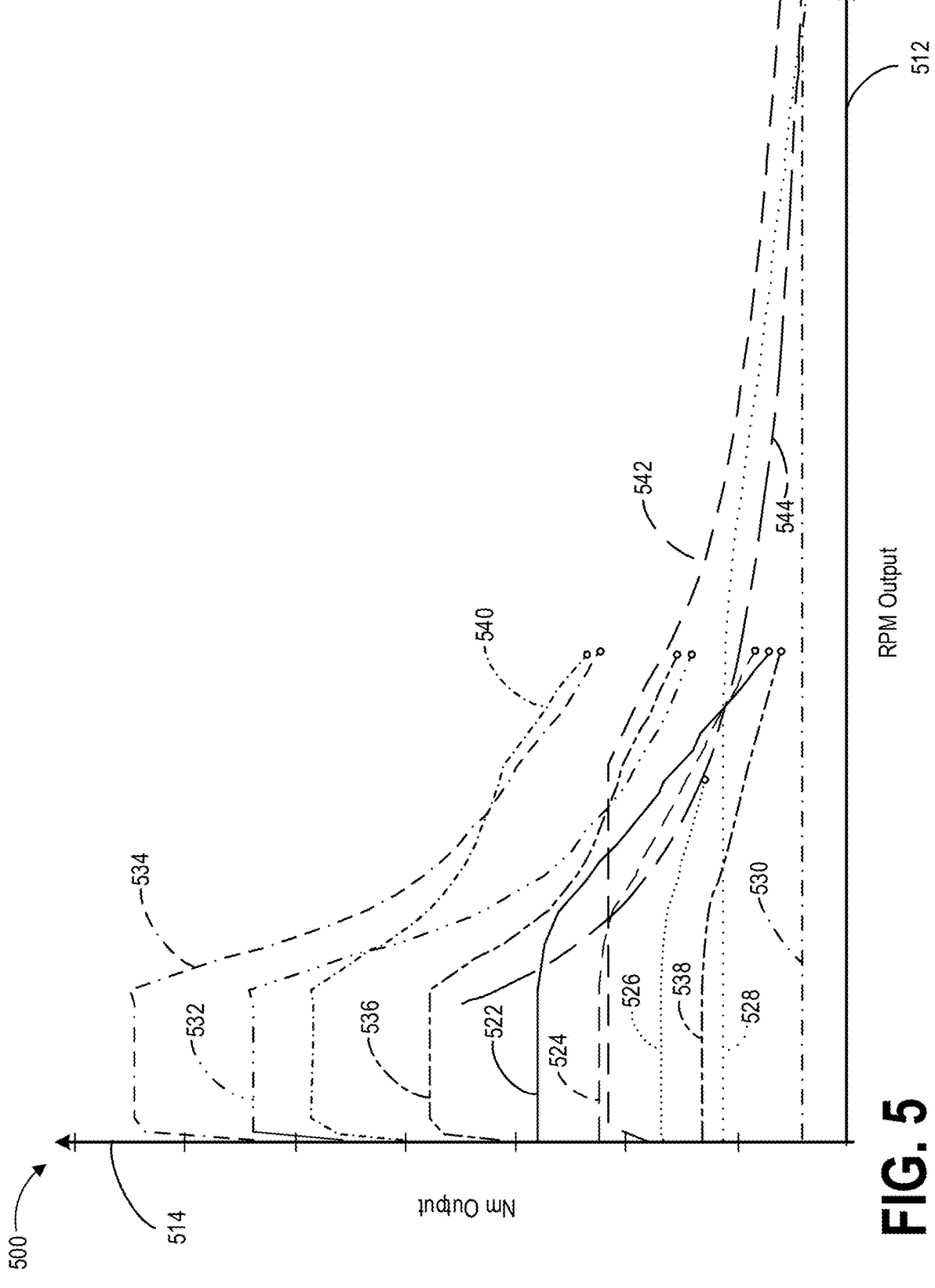
FIG. 5 shows a graph with a plurality of traces of power versus rotational energy for selected gears.

FIG. 5 shows a graph with a plurality of traces of power versus rotational energy for selected gears.

It is also to be understood that the specific assemblies and systems illustrated in the attached drawings, and described in the following specification are exemplary embodiments of the inventive concepts defined herein. For purposes of discussion, the drawings are described collectively. Thus, like elements may be commonly referred to herein with like reference numerals and may not be re-introduced.

FIGS. 1-3 shows a schematic of an example configuration with relative positioning of the various components. As used herein, the terms "approximately" is construed to mean plus or minus five percent of the range unless otherwise specified.

Further, FIGS. 1-3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. Moreover, the components may be described as they relate to reference axes included in the drawings.

Features described as axial may be approximately parallel with an axis referenced unless otherwise specified. Features described as counter-axial may be approximately perpendicular to the axis referenced unless otherwise specified. Features described as radial may circumferentially surround or extend outward from an axis, such as the axis referenced, or a component or feature described prior as being radial to a referenced axis, unless otherwise specified.

Features described as longitudinal may be approximately parallel with an axis that is longitudinal. A lateral axis may be normal to a longitudinal axis and a vertical axis. Features described as lateral may be approximately parallel with the lateral axis. A vertical axis may be normal to a lateral axis and a longitudinal axis. Features described as vertical may be approximately parallel with a vertical axis.

Turning to FIG. 1, a vehicle 100 is shown comprising a powertrain 101 and a drivetrain 103. The vehicle 100 may have a front end 132 and a rear end 134, located on opposite sides of vehicle 100. Objects, components, and features of the vehicle 100 referred to as being located near the front may be closest to the front end 132 compared to the rear end 134. Objects, components, and features of the vehicle 100 referred to as being located near the rear may be closest to the rear end 134 compared to the front end 132. The vehicle 100 may have a longitudinal axis 130. The powertrain 101 and drivetrain 103 may each have a length parallel with the longitudinal axis 130.

The powertrain 101 includes a prime mover 106 and a transmission 108. For an example the prime mover 106 may be an internal combustion engine (ICE). For another example the prime mover 106 may be an electric machine, such as an electric motor or an electric motor/generator. The prime mover 106 is operated to provide rotary power to the transmission 108. The transmission 108 receives the rotary power produced by the prime mover 106 as an input and outputs rotary power to the drivetrain 103 in accordance with a selected gear or setting. The vehicle 100 is an all-electric vehicle and/or a vehicle with all-electric modes of operation, such as a plug-in hybrid vehicle. The vehicle 100 may be a hybrid vehicle, wherein there are multiple torque inputs to the transmission 108. The vehicle 100 has multiple sources of torque to the transmission 108, such as plurality of electric machines 120.

The vehicle 100 may include at least three electric machines with outputs to the transmission 108, where the three electric machines may be used for powershifting using a transmission layout of the present disclosure. For a first example, the at least three electric machines may include the prime mover 106 and two electric machines of the plurality the electric machines 120. For a second example, where the prime mover 106 is not an electric machine, the three electric machines may include three electric machines of the electric machines 120.

The prime mover 106 may be powered via energy from an energy storage device 105, such as if the prime mover 106 is an electric machine. In one example, the energy storage device 105 is a battery, such as a traction battery, configured to store electrical energy. One or more of a plurality of inverters 107 may be arranged between the energy storage device 105 and the prime mover 106 and configured to adjust direct current (DC) to alternating current (AC). Likewise, the electric machines 120 may be powered via electricity from the energy storage device 105. One or more of a plurality of inverters may be arranged between the energy storage device 105 and the electric machines 120 to adjust direct current (DC) to alternating current (AC). The inverters 107 may electrically couple to the energy storage device 105, and the one or more of the inverters 107 may electrically couple to the prime mover 106 and/or electric machines 120. The inverters 107 may include a variety of components and circuitry with thermal demands that effect an efficiency of the inverter. Electrical components may be electrically coupled via a plurality of electrical connections 228.

The vehicle 100 may be an all-electric vehicle with a plurality of electric machines configured to supply power the axle assembly 102. In some examples, additionally or alternatively, the vehicle 100 may be a hybrid vehicle including both an engine and one or more of a plurality electric machine each configured to supply power to the axle assembly 102. For example, the axle assembly 102 may be driven via power originating from the engine in a first operating mode where the electric machine is not operated to provide power (e.g., an engine-only mode). The axle assembly 102 may be driven via power originating from the electric machine in a second operating mode where the engine is not operated to provide power (e.g., an electric-only mode). The axle assembly 102 may be driven via power originating from both the engine and the electric machine in a third operating mode (e.g., an electric assist mode). As another example, the axle assembly 102 may be an electric axle assembly configured to be driven by an integrated electric machine.

The vehicle 100 may be a commercial vehicle, light, medium, or heavy duty vehicle, a passenger vehicle, an off-highway vehicle, a commercial vehicle, agricultural vehicle, and/or sport utility vehicle. For an example embodiment, the vehicle 100 may be a wheeled vehicle, such as an automobile. However, additionally or alternatively, the vehicle 100 may be plane, a boat, or other vehicle system. Additionally or alternatively, the vehicle 100 and/or one or more of its components, such as components of the powertrain 101 and/or drivetrain 103, may be used in industrial, locomotive, military, agricultural, and/or aerospace applications.

The drivetrain 103 includes an axle assembly 102. The axle assembly 102 may be configured to drive a set of wheels 104. For an example, the axle assembly 102 is arranged near the rear of the vehicle 100 and thereby comprises a rear axle. However, it is to be appreciated that the location of the axle assembly 102 may be non-limiting. For another example, the axle assembly 102 may be arranged near the front of the vehicle 100 and thereby comprises a front axle. For another example, the axle assembly 102 may be arranged near another part of the vehicle. The drivetrain 103 may output torque to the axle assembly 102. For the example shown in FIG. 1, the drivetrain 103 is shown in a four-wheel drive configuration, although other configurations are possible. For example, the drivetrain 103 may include a rear-wheel drive or an all-wheel drive configuration. Further, the drivetrain 103 may include one or more tandem axle assemblies. As such, the drivetrain 103 may have other configurations without departing from the scope of this disclosure, and the configuration shown in FIG. 1 is provided for illustration, not limitation. Further, the vehicle 100 may include additional wheels that are not coupled to the drivetrain 103.

In some configurations, such as shown in FIG. 1, the drivetrain 103 includes a driveshaft 122 configured to receive rotary power output by the transmission 108. The driveshaft 122 may drivingly couple and transmit the rotary power from the transmission to the axle assembly 102. The driveshaft 122 may be positioned to extend in parallel with the longitudinal axis 130. For an example of a configuration of vehicle 100, the driveshaft 122 may be centered about the longitudinal axis 130. The driveshaft 122 may drivingly couple and transmit rotary power from the transmission to a differential 126 of the axle assembly 102 to drive the set of wheels 104. The driveshaft 122 may be a rear driveshaft, transferring torque to the rear of the vehicle 100, such as for a rear wheel drive. However, it is to be appreciated that for alternate configurations of the drivetrain 103, the driveshaft 122 may be a front driveshaft, transferring torque to the front of the vehicle 100, such as if the axle assembly 102 is at the front of the vehicle 100 and/or for a front wheel drive.

In some embodiments, additionally or alternatively, the transmission 108 may be a first transmission, and the vehicle 100 may have a second transmission arranged on the second set of axle shafts 128. The transmission 108 may be a gearbox. Alternatively, the transmission 108 may be an axle transmission or a trans axle transmission.

FIG. 2, shows a first schematic 200 of a first transmission system 202. The first transmission system 202 is a first example of a transmission system of the present disclosure. The first transmission system 202 includes the transmission 108 and a plurality of movers with inputs to the transmission 108. Further, first transmission system 202 may be part of a first power train system including a plurality of movers.

The first transmission system 202 may be divided into a first section 212, a second section 214, and a third section 216, indicated by dashed line perimeters. The first section 212 may include a plurality of first gearsets and a first non-friction clutch. The second section may include a plurality of second gearsets and a plurality of second non-friction clutches. The third section may include a plurality of third gearsets and a third non-friction clutch. The transmission 108 includes a housing 210 and a reduction assembly, such as a first gear assembly 218. The first section 212, the second section 214, and the third section 216 may include portions of the first gear assembly 218, including different rotational elements. The rotational elements of the first gear assembly 218 may rotate or spin. Certain components of the first gear assembly 218, such as components of the non-friction clutches, may be shifted in a first direction 204 or a second direction 206.

The movers of the first transmission system 202 include at least three movers: a first mover, a second mover, and a third mover. Each of the first mover, the second mover, and the third mover has an input, such as a shaft, that may drivingly couple to the respective mover and the transmission 108 such as to drive gearsets and an output of the first transmission system 202. For an example, the three movers may be electric machines and include a first electric machine 222, a second electric machine 224, and a third electric machine 226, where the electric machines may be electric motors and/or electric motor/generators. Said in another way the first mover may be the first electric machine 222, the second mover may be the second electric machine 224, and the third mover may be the third electric machine 226.

During operations of the transmission 108 where gears states are not shifted (e.g., non-shifting operations), the first electric machine 222, the second electric machine 224, and the third electric machine 226 provide power simultaneously via torque to the transmission 108. During operations when shifting gears of the transmission 108 (e.g., gear shifting operations), two electric machines of the first electric machine 222, the second electric machine 224, and the third electric machine 226 provide power to the transmission 108. For example, the third electric machine 226 may be supported by the first electric machine 222 or the second electric machine 224 during a gear shift of the transmission 108, where torque is cut from the supported electric machine to an output from the transmission 108 and the other electric machines supporting the supported electric output torque at an increased amount.

The first section 212 is a mover swapping section, where movers of a vehicle housing the first transmission system may be selectively coupled to one or more of the plurality of first gearsets to transfer rotational energy into the transmission. The first section 212 may also referred to herein, as a mover swapping section, an electric machine swapping section or an E-section. The first section includes at least a first clutch, referred to herein as a first section clutch. The first section clutch may be an electric machine swapping clutch and referred alternatively herein as an E-clutch.

The second section 214 is a powershifting section, where one or more of a plurality second gearsets and/or other reduction sets may be selectively coupled via powershifting. Powershifting and other selective coupling to the second gearsets and/or other reduction sets may be performed via shifting the plurality of second clutches of the second section, referred to herein alternatively as second section clutches. The second section clutches may include a plurality of second non-friction clutches of the second section. Powershifting may be performed via the clutches and reducers, such as gears, of the second section 214, such as at a torque from the first electric machine 222, second electric machine 224, and/or third electric machine 226 that produces a rotational speed below a threshold of speed, (e.g., at a low speed). At least two clutches of the second section clutches may be referred to as powershifting clutches, enabling powershifting via a method when either of the clutch is synchronized, closed, and transitioned to a new gear state. The second non-friction clutches may be the powershifting clutches, and there may be at least two powershifting clutches for the second section 214.

The third section 216 is a non-powershifting section, where one or more of a plurality of third gearsets may be selectively coupled without powershifting. The selective coupling to the third gearsets may be performed via shifting at least a third clutch of the third section, referred to alternatively herein as a third section clutch or a plurality of third section clutches. The third section clutch or third section clutches may include one or more third non-friction clutch(es) of the third section. Shifting may be performed by the non-powershifting section, such as at a torque from the first electric machine 222, second electric machine 224, and/or third electric machine 226 that produces a rotational speed at or above the threshold of speed, (e.g., at a high speed).

The first section 212 and the second section 214 via their respective gears, shafts, clutches, and other rotational elements may be used to shift gears states (e.g., shift gears) and, more specifically, upshift from a first gear state (e.g., a first gear and gear mode for the transmission 108) to a second gear state (e.g., a second gear and gear mode for the transmission 108), where the second gear state is a greater ratio than the first gear state. Likewise, the first section 212, the second section 214, and the third section 216 via their respective gears, shafts, clutches, and other rotational elements may be used to shift gears from the second gear state to a third gear state (e.g., a third gear and gear mode of the transmission 108), where the third gear state is a greater ratio than the second gear state. Shifting to the third gear state may be for speeds at or above the threshold of speed.

One or more of the plurality of inverters 107 may be arranged between an energy storage device and the first, second, and third electric machines 222, 224, 226, where the inverters may be configured to adjust direct current (DC) to alternating current (AC) for the electric machines and vice versa. For example, a first inverter 232 may electrically couple the first electric machine 222 and the energy storage device 105, where the first inverter 232 may adjust DC to AC and/or vice versa. A second inverter 234 may electrically couple the second electric machine 224 and the energy storage device 105, where the second inverter 234 may adjust DC to AC and/or vice versa. A third inverter 236 may electrically couple the third electric machine 226 and the energy storage device 105, where the third inverter 236 may adjust DC to AC and/or vice versa.

The transmission 108 may have a plurality of inputs via which torque and/or other rotational energy may flow to the first gear assembly 218, such as a first shaft 238, a second shaft 240, and a third shaft 242. For a first example, the first electric machine 222 may drivingly couple the first shaft 238. The second electric machine 224 may drivingly couple the second shaft 240. The third electric machine 226 may drivingly couple the third shaft 242. The transmission 108 may have at least an output, such as a fourth shaft 244. The fourth shaft 244 may include a first output interface 248 and a second output interface 250 that may drivingly couple and/or rigidly couple to other rotational elements, such as other shafts. The fourth shaft 244 may transfer rotational power from the transmission 108 and the third section 216 via the first output interface 248 and/or the second output interface 250. The first shaft 238, the second shaft 240, and the third shaft 242 may drivingly couple to a plurality of rotational elements of the first section 212. The first shaft 238 and second shaft 240 may transfer power-flows, such as via torque, from the first section 212 to the second section 214. The first gear assembly 218 may include a fifth shaft 246. The fifth shaft 246 may drivingly couple to the fourth shaft 244. The fifth shaft 246 may transfer a power-flow from the second section 214 to the third section 216. Additionally, it is to be appreciated that for another example the electric machines may drivingly couple to other shafts than the first shaft 238, the second shaft 240, and/or the third shaft 242, where each of each of the other shafts may rigidly couple the first shaft 238, the second shaft 240, or the third shaft 242.

The transmission 108 and the first gear assembly 218 may include a plurality of reduction sets (or reduction stages) that are of different ratios, where a reduction set of a different ratio than another reduction set may output a different rotational speed and torque with the same input torque. For example, the reduction sets may be gearsets and a part of the first gear assembly 218. The first section 212 may include a first gearset 252 and a second gearset 254, where the first gearset 252 and second gearset 254 are a first section first gearset and a first section second gearset, respectively, of the first gearsets. Said in another way, the first gearset 252 and the second gearset 254 are a plurality first section gearsets of the first section 212. The second section 214 may include a third gearset 256 and a fourth gearset 258, where the third gearset 256 and fourth gearset 258 are a second section first gearset and a second section second gearset, respectively, of the second gearsets. Said in another way, the third gearset 256 and the fourth gearset 258 are a plurality second section gearsets of the second section 214. The third section 216 may include a fifth gearset 260 and a sixth gearset 262. where the fifth gearset 260 and sixth gearset 262 are a third section first gearset and a third section second gearset of the third gearsets. Said in another way, the fifth gearset 260 and the sixth gearset 262 are a plurality of third section gearsets of the third section 216.

The first shaft 238 may drivingly couple the first gearset 252, such as via rigidly coupling. The second shaft 240 may drivingly couple the second gearset 254, such as via rigidly coupling. The third shaft 242 may drivingly couple to the first gearset 252 or the second gearset 254 via selective coupling via closing a first clutch 264. The first clutch 264 is the electric machine swapping clutch (e.g., an E-clutch of FIG. 4). The first shaft 238 may drivingly couple the third gearset 256 or the fourth gearset 258 via selective coupling via closing a second clutch 266. Likewise, the second shaft 240 may drivingly couple the third gearset 256 or the fourth gearset 258 via selective coupling via closing a third clutch 268. The second clutch 266 may be a first powershifting clutch (e.g., a P1-clutch of FIG. 4) allowing for powershifting between the first shaft 238 and the third gearset 256 or fourth gearset 258. The third clutch 268 may be a second powershifting clutch (e.g., a P2-clutch of FIG. 4) allowing for powershifting between the second shaft 240 and the third gearset 256 or the fourth gearset 258. The third gearset 256 and fourth gearset 258 may drivingly couple the fifth shaft 246, such as via rigidly coupling. The fifth shaft 246 may drivingly couple the fifth gearset 260 and the sixth gearset 262 via selective coupling via closing a fourth clutch 270. The fourth clutch 270 may be a non-powershifting clutch (e.g., an NP-clutch of FIG. 4), where powershifting may not occur when the fourth clutch 270 selectively couples with either the fifth gearset 260 or the sixth gearset 262. Said in another way, the fourth clutch 270 shifts gears via a non-powershifting gearshift. The fifth gearset 260 and the sixth gearset 262 may drivingly couple the fifth shaft 246, such as via rigidly coupling.

The first clutch 264, the second clutch 266, the third clutch 268, and the fourth clutch 270 may be non-friction clutches, such as dog clutches for an example and/or other types of on/off clutches for another example. The first clutch 264 may be a first non-friction clutch of the first section 212. The second clutch 266 and the third clutch 268 may be the first non-friction clutch and second non-friction clutch, respectively, of the second section 214. The fourth clutch 270 may be a non-friction clutch of the third section 216.

The first gearset 252 may include a first gear 272 and a second gear 274. The second gearset 254 may include a third gear 276 and a fourth gear 278. The first shaft 238 may rigidly couple the first gear 272. The first clutch 264 may selectively couple to the second gear 274 or the third gear 276. An engaging component and input of first clutch 264, such as a dog, may drivingly couple to the third shaft 242. The engaging component of the first clutch 264 may be shifted in the second direction 206 to selectively couple with the second gear 274. The engaging component of the first clutch 264 may be shifted in the first direction 204 to selectively couple the third gear 276. The second shaft 240 may rigidly couple the fourth gear 278.

The third gearset 256 may include a fifth gear 280, a sixth gear 282, and a seventh gear 284. The fourth gearset 258 may include an eighth gear 286, a ninth gear 288, and a tenth gear 290. The second clutch 266 may selectively couple to the fifth gear 280 or the eighth gear 286. An engaging component and input of the second clutch 266, such as a dog, may drivingly couple to the first shaft 238. The engaging component of the second clutch 266 may be shifted in the first direction 204 to selectively couple the fifth gear 280. The engaging component of the second clutch 266 may be shifted in the first direction 204 to selectively couple the eighth gear 286. The third clutch 268 may selectively couple to the seventh gear 284 or the tenth gear 290. An engaging component and input of the third clutch 268, such as a dog, may drivingly couple to the second shaft 240. The engaging component of the third clutch 268 may be shifted in the first direction 204 to selectively couple the seventh gear 284. The engaging component of the third clutch 268 may be shifted in the second direction 206 to selectively couple with the tenth gear 290. The sixth gear 282 and the ninth gear 288 may rigidly couple to the fifth shaft 246.

The fifth gearset 260 may include an eleventh gear 292 and a twelfth gear 294. The sixth gearset 262 may include a thirteenth gear 296 and a fourteenth gear 298. The fourth clutch 270 may selectively couple to the eleventh gear 292 or the thirteenth gear 296. An engaging component and input of the fourth clutch 270, such as a dog, may drivingly couple to the fifth shaft 246. The engaging component of the fourth clutch 270 may be shifted in the first direction 204 to selectively couple the eleventh gear 292. The engaging component of the fourth clutch 270 may be shifted in the second direction 206 to selectively couple the thirteenth gear 296. The twelfth gear 294 and the fourteenth gear 298 may rigidly couple the fourth shaft 244.

The first shaft 238 may rigidly couple the first gear 272. The first clutch 264 may selectively couple to the second gear 274 or the third gear 276.

Turning to FIG. 3, it shows a second schematic 300 showing a second transmission system 302. The second transmission system 302 is a second example of a transmission system of the present disclosure. The second transmission system 302 includes a second gear assembly 318 housed by the transmission 108. Further, the second transmission system 302 may be part a second power train system including a plurality of movers.

The second gear assembly 318 includes gearsets to a power take off (PTO) system. The PTO system may be a system to direct and modify torque to a work implement, where the work implement may drive/power process unrelated to the driving the wheels or the generating power for the powertrain and electrical systems of a vehicle housing the second transmission system 302. When modified, a torque through the PTO may be increased or decreased via increasing or decreasing, respectively, the number of reducers. The reducers may be a gears of a gearset. The work implement may be used drive a driven device. An example of such a work implement may be referred to herein as a PTO implement 334 and such a device referred to herein as a PTO device, herein. The PTO device may include a pump, a blower, an air conditioning (AC) unit, a generator, a drill, or another rotational element. The PTO system may be driven by a mover, such as one or more of the first electric machine 222, the second electric machine 224, and the third electric machine 226.

For an example, the PTO system of the second transmission system 302 includes a PTO gearset 332 and the PTO implement 334. The PTO gearset 332 is a fifth reduction set/gearset that may output to a PTO implement 334. An electric machine may drivingly couple to the PTO gearset 332, such that a power-flow from the electric machine may be directed to drive the PTO implement 334. The third electric machine 226 drivingly couples the PTO gearset 332 and therein may drivingly couple and drive the PTO implement 334 via the PTO gearset 332.

The second gear assembly 318 includes the gearsets and gears of the first gear assembly 218 of FIG. 2 and the PTO gearset 332. The second gear assembly 318 includes a sixth shaft 326 and a seventh shaft 328. The sixth shaft 326 and the seventh shaft 328 may drivingly couple the first section 212 to the second section 214. The first gearset 252 may drivingly couple to the sixth shaft 326, and the first gearset 252 may drivingly couple the first shaft 238 to the sixth shaft 326. Likewise, the seventh shaft 328 may drivingly couple the second gearset 254. The sixth shaft 326 may drivingly couple the third gearset 256 or the fourth gearset 258 via selective coupling, via the closing of the second clutch 266. Likewise, the seventh shaft 328 may drivingly couple the third gearset 256 or the fourth gearset 258 via selective coupling, via the closing of the third clutch 268. An engaging component and input of the second clutch 266 may drivingly couple to the sixth shaft 326. An engaging component and input of the third clutch 268 may drivingly couple to the seventh shaft 328.

The third shaft 242 may drivingly couple to the PTO gearset 332, such as to transfer a power-flow from the third electric machine 226 to the PTO gearset 332. The PTO gearset 332 may drivingly couple and transfer torque to the PTO implement 334 via a disconnect 340. The disconnect 340 may selectively and rigidly couple an output 336 of the PTO gearset 332 to an input 338 to the PTO implement 334, such as when the disconnect 340 is closed. The output 336 and the input 338 may be rotational elements, such as shafts, via which a power-flow may be transferred. The output 336 may be an input to the disconnect 340, while the input 338 may be an output from the disconnect 340. The disconnect 340 may be a clutch or be an assembly that includes a clutch.

For an example, the PTO gearset 332 may include a fifteenth gear 362 and a sixteenth gear 364. The third shaft 242 may rigidly couple the fifteenth gear 362. The sixteenth gear 364 may rigidly couple the output 336.

The first gearset 252 may include a seventeenth gear 372, in addition to the first and second gears 272, 274. The seventeenth gear 372 may rigidly couple to the sixth shaft 326. The seventeenth gear 372 may intermesh with the first gear 272 and the second gear 274, where the first gear 272 and the seventeenth gear 372 may form a first gear reduction, and the second gear 274 and the seventeenth gear 372 may form a second gear reduction. The first gear 272 and the second gear 274 may be a first and a second input gear, respectively, for the first gearset 252. The seventeenth gear 372 may be an output gear for the first gearset 252, outputting power from a power-flow to the sixth shaft 326. The first gear 272 and the second gear 274 may input torque simultaneously or independently into the seventeenth gear 372.

The second gearset 254 may include an eighteenth gear 374, in addition to the third and fourth gears 276, 278. The eighteenth gear 374 may rigidly couple to the seventh shaft 328. The eighteenth gear 374 may intermesh with the third gear 276 and the fourth gear 278, where the third gear 276 and the eighteenth gear 374 may form a first gear reduction, and the fourth gear 278 and the eighteenth gear 374 may form a second gear reduction. The third gear 276 and the fourth gear 278 may be a first and a second input gear, respectively, for the second gearset 254. The eighteenth gear 374 may be an output gear for the second gearset 254, outputting power from a power-flow to the seventh shaft 328. The third gear 276 and the fourth gear 278 may input torque simultaneously or independently into the eighteenth gear 374.

Referring to both FIG. 2 and FIG. 3, the first and second transmission systems 202, 302 may be controlled to operate in at least three gear states (e.g., three gears and three gear modes of different ratios), including: a first gear state (e.g., a first gear and a first gear mode), a second gear state (e.g., a second gear and a second gear mode), and a third gear state (e.g. a third gear and a third gear mode), where the transmission 108 outputs rotational energy at different ratios.

In the first gear state, the first gearset 252, the third gearset 256, and the fifth gearset 260 are selected for power-flow. Rotary power may flow through the first clutch 264 to the first gearset 252, the second clutch 266 and the third clutch 268 to the third gearset 256, and the fourth clutch 270 to the fifth gearset 260.

More specifically, the first electric machine 222 may generate and transfer rotational energy and rotary power as part of a first power-flow to drive the third gearset 256 via the second clutch 266, when the second clutch 266 is closed in the first direction 204. The first power-flow may continue transferring rotational energy and power from the second gearset 254 to drive the fifth gearset 260 and the fourth shaft 244 from the third gearset 256 via the fourth clutch 270, such as when the fourth clutch 270 is closed in the first direction 204. The second electric machine 224 may generate and transfer rotational energy and rotational power as part of a second power-flow to drive the third gearset 256 via the third clutch 268, such as when the third clutch 268 is closed the first direction 204. The second power-flow may continue transferring rotational energy and power from the third gearset 256 to drive the fifth gearset 260 and the fourth shaft 244 via the fourth clutch 270, such as when the fourth clutch 270 is closed in the first direction 204. The third electric machine 226 may generate and transfer rotational energy and rotational power as a third power-flow to drive the first gearset 252 via the first clutch 264, such as when the first clutch 264 is closed in the second direction 206. The third power-flow may continue transferring rotational energy and power from the first gearset 252 to the drive the third gearset 256 via the second clutch 266, such as when the second clutch 266 is closed in the first direction 204. Further, the third power-flow may continue transferring rotational energy and power from the third gearset 256 to the fifth gearset 260 and the fourth shaft 244 via the fourth clutch 270, such as when the fourth clutch 270 is closed in the first direction 204.

In the second gear state, the second gearset 254, the fourth gearset 258, and the fifth gearset 260 are selected for power-flow. Power may flow through the first clutch 264 to the second gearset 254, the second clutch 266 and the third clutch 268 to the fourth gearset 258, and the fourth clutch 270 to the fifth gearset 260.

More specifically, the first electric machine 222 may generate and transfer rotational energy and rotational power as part of a fourth power-flow to drive the fourth gearset 258 via the second clutch 266, such as when the second clutch 266 is closed in the second direction 206. The fourth power-flow may continue from the fourth gearset 258 and transfer rotational energy and power to drive the fifth gearset 260 and the fourth shaft 244 via the fourth clutch 270, such as when the fourth clutch 270 is closed in the first direction 204. The second electric machine 224 may generate and transfer rotational energy and rotational power as part of a fifth power-flow to drive the fourth gearset 258 via the third clutch 268, such as when the third clutch 268 is closed in the second direction 206. The fifth power-flow may continue from the fourth gearset 258 and transfer rotational energy and power to drive the fifth gearset 260 and the fourth shaft 244 via the fourth clutch 270, such as when the fourth clutch 270 is closed in the first direction 204. The third electric machine 226 may generate and transfer rotational energy and rotational power as a sixth power-flow to drive the second gearset 254 via the first clutch 264, such as when the first clutch 264 is closed in the first direction 204. The sixth power-flow may continue from the second gearset 254 and transfer rotational energy and power to the drive the fourth gearset 258 via the third clutch 268, such as when the third clutch 268 is closed in the second direction 206. Further, the sixth power-flow may continue transferring rotational energy and power from the fourth gearset 258 to the fifth gearset 260 and the fourth shaft 244 via the fourth clutch 270, such when the fourth clutch 270 is closed in the second direction 206.

In the third gear state, the second gearset 254, the fourth gearset 258, and the sixth gearset 262 are selected for power-flow. Power may flow through the first clutch 264 to the second gearset 254, the second clutch 266 and the third clutch 268 to the fourth gearset 258, and the fourth clutch 270 to the sixth gearset 262.

More specifically, the first electric machine 222 may generate and transfer rotational energy and rotational power as part of a seventh power-flow to drive the fourth gearset 258 via the second clutch 266, such as when the second clutch 266 is closed in the second direction 206. The seventh power-flow may continue from the third gearset 256 and transfer rotational energy and power to drive the sixth gearset 262 and the fourth shaft 244 via the fourth clutch 270, such as when the fourth clutch 270 is closed in the second direction 206. The second electric machine 224 may generate and transfer rotational energy and rotational power as part of an eighth power-flow to drive the fourth gearset 258 via the third clutch 268, such as when the third clutch 268 is closed in the second direction 206. The eighth power-flow may continue from the third gearset 256 and transfer rotational energy and power to drive the sixth gearset 262 and the fourth shaft 244 via the fourth clutch 270, such as when the fourth clutch 270 is closed in the second direction 206. The third electric machine 226 may generate and transfer rotational energy and rotational power as a ninth power-flow to drive the second gearset 254 via the first clutch 264, such as when the first clutch is closed in the first direction 204. The ninth power-flow may continue from the second gearset 254 and transfer rotational energy and power to the drive the fourth gearset 258 via the third clutch 268, such as when the third clutch is closed in the second direction 206. Further the ninth power-flow may continue from the fourth gearset 258 and transfer rotational energy and power to drive the sixth gearset 262 and the fourth shaft 244 via the fourth clutch 270, such as via closing the fourth clutch in the second direction.

Additionally, the transmission may be placed into a plurality of transitional gear states between the first gear state and the second gear state.

For example, while transitioning from the first gear state to the second gear state, the transmission may be placed in a first transitional gear state, referred to herein as a condition-a state. In the condition-a state, the first gearset 252, the third gearset 256, the fourth gearset 258, and the fifth gearset 260 are selected for power-flow. Rotary power may flow through the first clutch 264 to the first gearset 252, the second clutch 266 to the fourth gearset 258, the third clutch 268 to the third gearset 256, and the fourth clutch 270 to the fifth gearset 260.

More specifically, during the condition-a state, the third clutch 268 is closed selectively coupling the shaft drivingly coupled to the second electric machine 224 to a gear of the fourth gearset 258. For example, the second shaft 240 or the shaft 328 is selectively coupled with the tenth gear 290, such that rotational energy and rotary power from the second electric machine 224 may drive the fourth gearset 258. Said in another way, during the condition-a state, the transmission 108 is configured such that the first electric machine 222 and the third electric machine 226 transmits rotational energy via the first power-flow and third power-flow, respectively, as described for the first gear state. Likewise, during the condition-a state, the transmission 108 is configured such that the second electric machine 224 transmits rotational energy via the fourth power-flow as described for the second gear state.

Likewise, while transitioning from the condition-a state to the second gear state, the transmission may be placed in a second transitional gear state, referred to herein as a condition-b state. In the condition-b state, the second gearset 254, the third gearset 256, the fourth gearset 258, and the fifth gearset 260 are selected for power-flow. Rotary power may flow through the first clutch 264 to the second gearset 254, the second clutch 266 to the fourth gearset 258, the third clutch 268 to the third gearset 256, and the fourth clutch 270 to the fifth gearset 260.

More specifically, during the condition-b state, the first clutch 264 is closed selectively coupling the shaft drivingly coupled to the third electric machine 226 to a gear of the second gearset 254. For example, the third shaft 242 is selectively coupled with the tenth gear 290, such that rotational energy and power from the third electric machine 226 may drive the fifth gearset 260. Said in another way, during the condition-b state, the transmission 108 is config- ured such that the first electric machine 222 transmits rotational energy via the first power-flow as described for the first gear state. Likewise, during the condition-b state, the transmission 108 is configured such that the second electric machine 224 and the third electric machine 226 transmit rotational energy via the fourth power-flow and the sixth power-flow described for the second gear state.

During the condition-b state the transmission is config- ured such that the third electric machine 226 outputs rota- tional energy via the sixth power-flow. Rotational energy may follow the sixth power-flow from the third electric machine, such as when the first clutch 264 and the second clutch 266 are both closed in the first direction 204. Rota- tional energy may be transferred to the second gearset 254 via the sixth power-flow. The sixth power-flow may continue from the second gearset 254 and transfer rotational energy and power to the drive the fourth gearset 258 via the third clutch 268, such as when the third clutch 268 is closed in the second direction 206. Further, the sixth power-flow may continue transferring rotational energy and power from the fourth gearset 258 to the fifth gearset 260 and the fourth shaft 244 via the fourth clutch 270, such when the fourth clutch 270 is closed in the first direction 204.

It is to be appreciated for the arrangement of FIG. 3, the second power-flow, fifth power-flow, and eighth power-flow from the second electric machine 224, may transfer rota- tional energy and power to the second gearset 254 upstream of the third gearset 256, transferring rotational energy and rotary power from the second gearset 254 to drive the third gearset 256 or the fourth gearset 258.

The effect of the arrangement shown via FIG. 3 is a transmission and power train allowing for powershifts while using dog clutches or other on/off style clutches, which may increase efficiency of power transferred during the closing of the clutch. Said in another way, the transmission and portion of the power train shown via FIG. 3 may decrease power losses between an input and output when closing a clutch. Further, during operations of a vehicle or another system powered by the electric machines of FIG. 3, the arrange- ment, and more specifically the non-power-shift system thereof, may extend the speed range and increase the power usage of the electric machines. The operation of at least two electric machines (EMs) during a shift during a peak mode may reduce power drop such that approximately no power drop occurs during a shifting of the gears and closing of the clutch.

The three EMs of the system (e.g., the first EM 222, the second EM 224, and the third EM 226) may output torque via the system providing traction at approximately the same gear and gear state, (e.g., the first gear, the second gear, and the third gear). The relationships and effects of the arrange- ment of FIGS. 2-3 are shown in greater detail in FIGS. 4-5.

Turning to FIG. 4, it shows a table 400 illustrating a method for upshifting from a first gear state (e.g., a first gear) to a second gear state (e.g., a second gear), and from the second gear state to a third gear state (e.g., a third gear) of a transmission system of the present disclosure. It is to be appreciated that first gear state, second gear state, and third gear state are different gear states or different gear modes where a plurality of differing combinations of gears and gearsets are selectively coupled via a clutch of the trans- mission to output different amounts of torque and rotational speeds at an output of the transmission from a consistent input of rotational energy via one or more inputs. The transmission system may be the first transmission system 202 or the second transmission system 302 of FIGS. 2 and 3, respectively. The transmission system may include examples of the transmission 108 of FIGS. 2-3 or other transmissions of the present disclosure.

The table 400 includes a first column 412 showing phases or steps of the method when switching from a first gear to a third gear. The transmission may have a plurality of gear states including first gear, second gear, and third gear that may be the configuration of gear states (e.g., the first gear, the second gear, and the third gear) described for the first and second transmission systems 202, 302. The second column 414 shows the state of an E-clutch (e.g., the electric machine swapping clutch) of the transmission system. The third column 416 shows the state of a P1 clutch (e.g., the first powershifting clutch) of the transmission system. The fourth column 418 shows the state of a P2 clutch (e.g., the second powershifting clutch) of the transmission system. The fifth column 420 shows the state of an NP clutch (e.g., the non-powershifting clutch) of the transmission system. The E-clutch, the P1 clutch, the P2 clutch, and the NP clutch may be the first clutch 264, the second clutch 266, the third clutch 268, and the fourth clutch 270 of FIGS. 2-3. The sixth column 422 shows a description of events that occur in each phase of the method of table 400.

Each of the clutches in the second column 414, third column 416, fourth column 418, and fifth column 420 have three states. Each of the clutches may be shifted in a direction to close and selectively couple a rotational ele- ment, such as a shaft, to a gear of a gearset. Likewise, each of the clutches may be shifted in an opposite direction (e.g., another direction opposite to the direction to selectively couple the gear) to close and selectively couple the rota- tional element to another gear of another gearset. A first state, referred to in table 400 as a first direction, where a clutch is shifted in a first direction to engage with a first rotational element, such as a gear of a gearset, and selec- tively couple the first rotational element with at least another rotational element, such as a shaft. A second state, referred to in table 400 as second direction, where the clutch is shifted in a second direction to engage with a second rotational element, such as another gear of another gearset, in the second direction opposite to the first direction. Further the clutch may be shifted to a neutral position where neither the gear or another gear may be selected. The neutral position may be a third state, where the clutch is discon- nected (e.g., Disco as shorthand in table 400), and not shifted in either the first direction or the second direction. When disconnected, power may not be transferred via the clutch from respective shaft of the clutch to the respective gears of the clutch. Said in another way, disconnecting a clutch includes decoupling a pair of rotational elements, reducing transfer of rotational energy and rotary power between rotational elements selectively coupleable via the clutch.

The first direction and second direction of one, more, or all of the clutches of table 400 may be the first direction 204 and the second direction 206, respectively, of FIGS. 2-3. However, it is to be appreciated, that the first direction and the second direction of table 400 may be specific to each clutch, where a first direction of a first state for a first clutch is different than a first direction of a first state of a second clutch. For example, the first direction at the first state and the second direction at the second state of table 400 for the P1 clutch may be a first direction and a first opposite direction, respectively. The first direction of a first state and the second direction of a second state of table 400 for the P2 clutch may be a second direction and a second opposite direction, respectively, where the second direction and the second opposite direction of the P2 clutch are different from the first direction and first opposite direction, respectively, of the P1 clutch. Further, the first direction of the first state the table 400 for the E-clutch may be a third direction different from the first direction of the P1 clutch and/or second direction of the P2 clutch. Likewise, the second direction of the second state of the table 400 for the E-clutch may be a third opposite direction, opposite to the third direction of the E-clutch and different from the first opposite direction of the P1 clutch and/or second opposite direction of the P2 clutch. Additionally, the first direction of the first state of the table 400 for the NP clutch may be a fourth direction different from the first direction, second direction, and/or third direction of the P1 clutch, the P2 clutch, and the E-clutch, respectively. Likewise, the second direction of the second state of the table 400 for the NP clutch may be a fourth opposite direction opposite to the fourth direction of the NP clutch and different from the first opposite direction, second opposite direction, and/or third opposite direction of the P1 clutch, the P2 clutch, and the E-clutch, respectively.

The method illustrated by table 400, shows transitioning and upshifting from the first gear state to the third gear state via the second gear state and a plurality of transitional gear states, including condition-a and condition-b gear states, with reference to FIGS. 2-3. Additionally or alternatively, the method illustrated by table 400, shows transitioning and upshifting from the first gear state to the second gear via a plurality of transitional gear states including the condition-a and condition-b gear states with reference to FIGS. 2-3. Additionally or alternatively, the method illustrated by table 400 includes transitioning to the second gear state to the third gear state with reference to FIGS. 2-3.

During the first phase of the method, the transmission is in the first gear state, where the E-clutch is in the second state, the P1 clutch is in the first state, the P2 clutch is in the first state, and the NP clutch is in the first state. Said in another way, operating in the first gear state includes holding the E-clutch closed in the second direction at the second state, holding the P1 clutch closed in the first direction at the first state, holding the P2 clutch closed in the first direction at the first state, and holding the non-powershifting clutch in the first direction at the first state.

Likewise, while the transmission is in the first gear state, all electric motors with inputs drivingly coupled to the transmission may flow power to the output. The electric motors include a first electric machine (EM1), a second electric machine (EM2), and a third electric machine (EM3), which may be the first electric machine 222, the second electric machine 224, and the third electric machine 226 of FIGS. 2-3, respectively. The output may be the fourth shaft 244 of FIGS. 2-3. The method includes providing rotational energy to a transmission, such as transmission 108, via the first electric machine through a first input, such as the first shaft 238 of FIGS. 2-3. during a first gear state. Further the method includes providing rotational energy to the transmission via the second electric machine through a second input, such as the second shaft 240. Additionally, the method includes providing rotational energy to the transmission from the third electric machine through a third input, such as the third shaft 242.

Closing the P1 clutch and P2 clutch in the first direction selectively couples a first rotational element drivingly coupled to the first electric machine and a second rotational element drivingly coupled to the second electric machine to a first gearset of the second section, e.g., a second section first gearset, therein drivingly coupling the first electric machine and the second electric machine to the second section first gearset. Closing the E-clutch in the second direction selectively couples a third input drivingly coupled the third electric machine to a first gearset of the first section, first section first gearset, therein drivingly coupling the third electric machine to the first section first gearset. Likewise, closing the P1 clutch in the first direction drivingly couples third electric machine with the second section first gearset. Further, closing the NP clutch drivingly couples the first electric machine, the second electric machine, and the third electric machine with a first gearset of the third section, e.g., a third section first gearset. The first section first gearset, the second section first gearset, and the third section first gearset may be a first gearset, a third gearset, and a fifth gearset of a transmission of the present disclosure. More specifically, the first gearset, the second section first gearset, and the third section first gearset may be the a first gearset 252, the third gearset 256, and the fifth gearset 260, respectively, of FIGS. 2-3.

During the first phase of the method, the rotational energy and rotary power-flows from the first electric machine via a first power-flow, the second electric machine via a second power-flow, and the third electric machine via a third power-flow. The first gear state may be the first gear state described with respect to FIG. 2-3 and share the same power-flows. The first power-flow may be the first power-flow described for FIGS. 2-3, the second power-flow may be the second power-flow described for FIGS. 2-3, and the third power-flow may be the third power-flow described for FIGS. 2-3 through the first transmission system 202 of FIG. 2 and the second transmission system 302 of FIG. 3.

During the second phase of the method, the E-clutch is in the second state, the P1 clutch is in the first state, the P2 clutch is disconnected in the neutral state, and the NP clutch is in the first state. Said in another way, the sixth phase of the method includes maintaining the E-clutch in the first state, maintain the P1 clutch closed in the first state, opening and maintain the P2 clutch opened and disconnected, and maintaining the NP clutch closed in the first state. Disconnecting and holding the P2 clutch in a disconnected state, includes decoupling the second electric machine from the second section first gearset.

During, the second phase, the first electric machine and the third electric machine transmit power to the output in a peak mode. Said in another way, the first electric machine and the third electric machine are operating in a peak mode, generating and transmitting additionally power to an output of the transmission. The additional power is greater than or equal to a threshold of rotary power desired from the second electric machine. The second phase therein allows power-shifting during a third phase of the method across the transmission while synchronizing the second electric machine with an output from the P2 clutch.

The second phase of the method includes cutting the second power-flow via disconnecting the P2 clutch and decoupling the second electric machine from the second section clutches. Rotational power from the first electric machine and the third electric machine may continue transmitting and driving the same gearsets as the first phase, such as the first gearset 252, the third gearset 256, and the fifth gearset 260. When in a peak mode, a maximum torque for the gear state is output over a period of time.

During the second phase of the method, the second electric machine syncs (synchronizes) or is prepared to change gear. Said in another way, the second phase of the method includes synchronizing the input and output of the P2 clutch via increasing or decreasing the speed of the second electric machine. While synchronizing, the method includes reducing or cutting rotational energy generated via the second electric machine from entering gearsets selectively couplable via the P1 and P2 clutches. For example, while synchronizing during the second phases, rotational energy generated via the second electric machine 224 may be reduced or diverted from transferring to and driving the third gearset 256. Said in another way, the method may include operating the first electric machine and the third electric machine at respective peak modes while synchronizing a first P1-clutch input (e.g., an input to the P1-clutch drivingly coupled to the second electric machine) with the output of the P1-clutch.

During the third phase of the method, the E-clutch is in the second state, the P1 clutch is in the first state, the P2 clutch is in the second state, and the NP clutch is in the first state. Said in another way, the third phase of the method includes maintaining the E-clutch in the second state, holding the P1 clutch closed in the first state, closing and holding the P2 clutch closed in the second state, and holding the NP clutch closed in the first state. Closing and holding the P2 in the second state, includes drivingly coupling the second electric machine to a second gearset of the second section, e.g. a second section second gearset. The second section second gearset may be the fourth gearset 258 of FIGS. 2-3.

The third phase places the transmission at a first intermediate gear state between the first gear and the second gear is reached, referred to herein as the condition-a state.

At the condition-a state, the first electric machine and third electric machine transmit power to the output in first gear, and the second electric machine transmits power to the output in second gear. Said in another way, by closing the and holding the P2 clutch closed in the second state, the second electric machine delivers power to the second section second gearset, such as the fourth gearset 258, and to the output of the transmission via a fifth power-flow. The condition-a state may be the condition-a state described with respect to FIG. 2-3 and share the same power-flows. The fifth power-flow may be the fifth power-flow described for FIGS. 2-3.

For an example, operating the electric machines at the third phase and condition-a includes transferring rotational power from the second electric machine 224 to the fourth gearset 258 and driving the fourth gearset 258. Further, operating the electric machines at the third phase and condition-a includes transferring rotational power from the second electric machine 224 from the fourth gearset 258 to the fifth gearset 260, and driving the fifth gearset 260 and the fourth shaft 244.

In the fourth phase of the method, the E-clutch is disconnected, the P1-clutch is in the first state, the P2-clutch is in the second state, and the NP clutch is in the first state. Said in another way, the fourth phase includes disconnecting and holding the E-clutch open and in a disconnected state, holding the P1 clutch closed in the first direction at the first state, holding the P2 clutch closed in the second direction at the second state, and holding the NP clutch in the first direction at the first state. Disconnecting and holding the E-clutch in a disconnected state, includes decoupling the third electric machine from the first section first gearset.

The fourth phase of the method includes cutting the third power-flow via disconnecting the E-clutch and decoupling the third electric machine from the first section gearsets. During the fourth phase, first electric machine and second electric machine transmit power to the output in a peak mode. Said in another way, the first electric machine and the second electric machine are operating in a peak mode, generating and transmitting additionally rotary power to an output of the transmission. The additional rotary power is greater than or equal to a threshold of rotary power desired from the third electric machine. The third electric machine is prepared to change gear.

In the fifth phase of the method, the E-clutch is in the first state, the P1 clutch is in the first state, the P2 clutch is in the second state, and the NP clutch is in the first state. Said in another way, the fifth phase of the method includes closing the E-clutch in the first direction and transitioning to the first state, holding the P1 clutch closed in the first state, holding the P2 clutch closed in the second state, and holding the NP clutch closed in the first state. Closing and holding the E-clutch the first state, includes drivingly coupling the third electric machine to a second gearset of the first section, e.g. a first section second gearset. Additionally, with the P2 clutch being closed in the second state, the E-clutch closing in the first state includes drivingly coupling the third electric machine to the second section second gearset. The first section second gearset may be the second gearset 254 of FIGS. 2-3.

During the fifth phase of the method, a second intermediate gear state between the first gear and the second gear is reached, referred to herein as condition-b. Condition-b may be the condition-b state referenced for the different examples of the transmission 108 of FIGS. 2-3.

At condition-b, the first electric motor transmits power to the output in first gear, and the second electric machine and third electric machine transmit power to the output in second gear. Said in another way, closing the and holding the P2 clutch closed, the third electric machine delivers power to a second gearset, such as the second gearset 254 of FIGS. 2-3, and to the output of the transmission via a sixth power-flow. The condition-b state may be the condition-b state described with respect to FIG. 2-3 and share the same power-flows. The sixth power-flow may be the sixth power-flow described for FIGS. 2-3.

In the sixth phase of the method, the E-clutch is in the first state, the P1 clutch is disconnected, the P2 clutch is in the second state, and the NP-clutch is in the first state. Said in another way, the sixth phase of the method includes maintaining the E-clutch in the first state, disconnecting the P1 clutch, maintain the P2 clutch closed in the second state, and maintain the NP clutch closed in the first state.

The sixth phase of the method includes cutting the first power-flow via disconnecting the P1 clutch and decoupling the first electric machine from the second section clutches. During the sixth phase of the method, the second electric machine and the third electric machine transmit to the output in a peak mode, while the first electric machine is prepared to change gear. Said in another way, the second electric machine and the third electric machine are operating in a peak mode, generating and transmitting additionally power to an output of the transmission. The additional power is greater than or equal to a threshold of rotary power desired from the first electric machine. The sixth phase therein allows powershifting during a third phase of the method across the transmission while synchronizing the second electric machine with an output from the P2 clutch.

During the sixth phase of the method, the first electric machine syncs (synchronizes) or is prepared to change gear. Said in another way, the sixth phase of the method includes synchronizing the input and output of the P1 clutch via increasing or decreasing the speed of the first electric machine.

In the seventh phase of the method, the E-clutch is in the first state, the P1 clutch is in the second state, the P2 clutch is in the second state, and the NP clutch is in the first state. Said in another way, the seventh phase of the method includes holding the E-clutch closed in the first state, closing and holding the P1 clutch closed in the second state, holding the P2 clutch closed in the second state, and holding the NP clutch closed in the first state. Closing and holding the P1 clutch closed in the second state, includes drivingly coupling the first electric machine to the second section second gearset.

Upon, entering the arrangement described via the seventh phase, the second gear state is reached, and all electric machines transmit power to the output in second gear. Said in another way, after the seventh phase of the method, the transmission has shifted from the first gear state to the second gear state. Said in another way, the seventh phase includes shifting to the second gear state.

At the second gear state, the first electric motor, the second electric machine, and third electric machine transmit power to the output in second gear. Said in another way, closing and holding the P1 clutch closed, allows the first electric machine to deliver rotary power to the fourth gearset and to the output of the transmission via a fourth power-flow. Likewise, holding the E-clutch closed while the P1 clutch is closed, allows the third electric machine to deliver rotary power to the second gearset, and from the second gearset to the fourth gearset. The second gear state may be the second gear state described with respect to FIG. 2-3 and share the same power-flows. The fourth power-flow may be the fourth power-flow described for FIGS. 2-3. Likewise, the sixth power-flow may be the sixth power-flow described for FIGS. 2-3.

During first phase through the seventh phase, clutches are shifted via powershifting, and there are no torque interrupts to an output shaft of the transmission, such as the fourth shaft 244 of FIGS. 2-3.

In the eighth phase of the method, the E-clutch is in the first state, the P1 clutch is in the second state, the P2 clutch is in the second state, and the NP clutch is disconnected. Said in another way, the eighth phase of the method includes holding the E-clutch closed in the first state, holding the P1 clutch closed in the second state, holding the P2 clutch closed in the second state, and opening (e.g., disconnecting) the NP clutch and holding the NP clutch in a disconnected state. With the NP clutch disconnected there is an interruption of power-flow between the electric machines and the output, referred to herein as a full torque interrupt. The shaft the NP clutch drive couples to, may spin freely without transferring power via torque to the output or gearsets that may drivingly couple the shaft to the output. Said in another way, the eighth phase of the method includes allowing the shaft the NP clutch drive couples to spin independently of the NP clutch and reduce transfer of rotary power, such as via torque, therebetween.

In the ninth phase of the method, the E-clutch is in the first state, the P1—is in the second state, the P2-clutch is in the second state, and the NP-clutch is in the second state. Said in another way, the ninth phase of the method includes holding the E-clutch closed in the first state, holding the P1 clutch closed in the second state, holding the P2 clutch closed is in the second state, and closing the NP clutch in the second direction and holding the NP clutch closed at the second state. Closing and holding the NP clutch closed in the second state, includes drivingly coupling the first electric machine, the second electric machine, and the third electric machine to a second gearset of the third section, e.g., to a third section second gearset. The third section second gearset may be the sixth gearset 262 of FIGS. 2-3.

After the ninth phase, the transmission is in third gear, and all electric motors flow power to the output. Said in another way, after the seventh phase of the method, the transmission has shifted from the first gear state to the second gear state. Said in another way, the ninth phase of the method includes shifting to the third gear state.

During eighth phase through the ninth phase, the NP clutch is shifted without powershifting, and transfer of torque is interrupted to the output shaft of the transmission. Said in another way, the NP clutch is shifted to drivingly couple the electric machines to the third section first gearset or the third section second gearset in a non-powershifting gearshift.

Turning to FIG. 5, it shows a graph 500 of torque versus rotational speed. The graph 500 includes a first axis 512 and a second axis 514. The first axis 512 shows an output rotational speed in rotations per minute (RPM). The second axis 514 shows an output torque in newton meters (Nm). The value of the first axis 512 and the value of the second axis 514 may increase in the direction of their respective arrows.

The graph 500 shows a plurality of traces. The traces illustrate the torque vs rotational speed of the electric machines for different clutch states of a transmission system of the present disclosure, such as the first transmission system 202 or the second transmission system 302 of FIGS. 2-3. The traces of the graph 500 may be related to the torque vs rotational speed of power-flows through different combinations clutch states, such as the clutch states referred to in the method of the table 400 of FIG. 4. Traces may be specific to different gear states such as first gear, second gear, third gear, condition-a, and condition-b referred to in table 400. Likewise, at least three electric machines, including the first electric machine (EM1), the second electric machine (EM2), and the third electric machine (EM3) with reference to FIG. 4, provide rotation energy via torque for the graph 500. Each trace of the graph includes a plurality of different clutch state corresponding to a clutch providing a power-flow for each EM. Said in another way each trace may be described with EM1, EM2, and EM3 each concatenated with a specific clutch state.

Traces of graph 500 include a first trace 522 represented via a plurality of solid lines, a second trace 524 represented via a plurality of dashed lines, a third trace 526 represented via a plurality of half dash lines, a fourth trace 528 represented via a plurality of dot lines, a fifth trace 530 represented via a plurality of dash dot lines, a sixth trace 532 represented via a plurality dash dot dot lines, a seventh trace 534 via a plurality of dash dash dot lines, an eighth trace 536 represented via a plurality of half dot lines, a ninth trace 538 represented via a plurality of long dash short dash lines, a tenth trace 540 represented via a plurality of half dash half dot lines, an eleventh trace 542 of a plurality of double dash lines, and a twelfth trace 544 of a double dash short dash line. Each of the traces of graph 500 terminate at a dot at an end of a trace.

In this way, the disclosed systems and methods provide a powershift in a certain output speed range using non-friction clutches. As a result, the disclosed transmission provides an efficient, lower drag, solution for gear shifting reducing power losses between the input and output of the transmission. The transmission system comprises a first section, a second section, and a third section. The first section is a mover swapping section, where movers, such as electric machines, may be selectively coupled to one or more of a plurality of first gearsets to transfer rotational energy into the transmission. The second section is powershifting section, where one or more of a plurality second gearsets may be selectively coupled via powershifting. The third section is a non-powershifting section, where one or more of a plurality of third gearsets may be selectively coupled without powershifting. The selective coupling between the first gearsets, second gearsets, and/or third gearsets may be accomplished via non-friction clutches. Additional sections may be added, such as a PTO system of a fourth section that outputs torque to a PTO implement.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology can be applied to powertrains that include different types of propulsion sources including different types of prime movers, internal combustion engines, and/or transmissions. The subject matter of the present disclosure includes all novel and non-obvious combinations and sub-combinations of the various systems and configurations, and other features, functions, and/or properties disclosed herein.

Note that the example control and estimation routines included herein can be used with various engine, electric machine, transmission, and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A transmission system, comprising:
a first section, comprising a plurality of first gearsets and at least a first non-friction clutch;
a second section, comprising a plurality of second gearsets and a plurality of second non-friction clutches;
a third section, comprising a plurality of third gearsets and a third non-friction clutch; and
a plurality of movers configured to selectively couple and drivingly couple to one or more of the first gearsets via the first non-friction clutch,
where the second non-friction clutches selectively couple and drivingly couple the second gearsets via powershifting, and where the third non-friction clutch selectively couple and drivingly couple third gearsets via a non-powershifting gearshift.

2. The transmission system of claim 1, where the transmission system has a first input, a second input, and a third input that are shafts.

3. The transmission system of claim 2, where the transmission system has a first mover drivingly couple the first input, a second mover drivingly couple the second input, and a third mover drivingly couple the third input.

4. The transmission system of claim 3, where the first mover is first electric machine, the second mover is a second electric machine, and the third mover is a third electric machine.

5. The transmission system of claim 2, where the first input drivingly couples a first gearset, and the first non-friction selectively couples the third input to the first gearset via the first non-friction clutch.

6. The transmission system of claim 5, where the second input drivingly couples a second gearset, and the first non-friction selectively couples the third input to the second gearset via the first non-friction clutch.

7. The transmission system of claim 2, where there is a first second non-friction clutch and a second second non-friction clutch.

8. The transmission system of claim 7, where the second gearsets include a first second gearset and a second second gearset, where the first second non-friction clutch selectively couples a first shaft to the first second gearset and the second second gearset, and the second second non-friction clutch selectively couples a second shaft to the first second gearset and the second second gearset.

9. The transmission system of claim 8, where the first shaft is the first input and the second shaft is the second input.

10. The transmission system of claim 2, where the transmission system has a PTO system including a PTO gearset, where the third input drivingly couples to the PTO gearset.

11. A power train system, comprising:
a first electric machine;
a second electric machine;
a third electric machine; and
a transmission system having:
    a first section, comprising a plurality of first section gearsets and at least a first non-friction clutch, where the first electric machine, the second electric machine, and the third electric machine are drivingly coupled to a first section gearsets;
    a second section, comprising a plurality of second section gearsets and a plurality of second non-friction clutches, and selectively coupleable to the first section gearsets via the second non-friction clutches;
    a third section, comprising a plurality of third section gearsets and a third clutch, and selectively couplable to the second section via the third clutch; and
    an output, where the output is selectively couplable to the third section gearsets via the third clutch.

12. The power train system of claim 11, where the second non-friction clutches include a first powershifting clutch and a second powershifting clutch that enable powershifts between a first input and the output, a second input and the output, and a third input and the output, where the first powershifting clutch selectively couples to a first gearset and a second gearset of the second section gearsets, and the second powershifting clutch selectively couples to the first gearset and the second gearset.

13. The power train system of claim 11, where the second non-friction clutches are dog clutches.

14. The power train system of claim 11, where the third electric machine selectively couples to the first section and the first section gearsets via the first non-friction clutch, and the first electric machine and the second electric machine are rigidly coupled to the first section gearsets.

15. The power train system of claim 14, where the third electric machine drivingly couples a PTO via a PTO gearset via an input selectively coupled to the first section via the first non-friction clutch.

16. A method of operating a transmission system, comprising:
providing rotational energy to a transmission via a first electric machine through a first input during a first gear state;
providing rotational energy to the transmission via a second electric machine through a second input;

providing rotational energy to the transmission via a third electric machine through a third input;
providing rotational energy from the first electric machine, the second electric machine, and third electric machine to an output of the transmission;
during a gear shift to a second gear state:
    disconnecting a first powershifting clutch;
    providing rotational energy to the output from the first electric machine and the third electric machine while synchronizing the second electric machine and transitioning to a first intermediate gear state;
    providing rotational energy to the output from the first electric machine and the second electric machine and decoupling the third electric machine while transitioning to a second intermediate gear state;
    disconnecting a second powershifting clutch; and
    providing rotational energy from the second electric machine and the third electric machine to the output while synchronizing the first electric machine and transitioning to the second gear state.

17. The method of claim 16 further comprising transitioning to the first intermediate gear state via disconnecting and closing the first powershifting clutch in a first opposite direction to a first direction when closed during the first gear state, transitioning to the second intermediate gear state via disconnecting and closing an electric machine swapping clutch in a second opposite direction to a second direction when closed during the first gear state, transitioning from the second intermediate gear state via disconnecting and closing the second powershifting clutch via a third opposite direction to a third direction when closed during the first gear state, and powershifting via increasing the rotational energy of a plurality of electric machines while synchronizing another electric machine.

18. The method of claim 16 further comprising transitioning the transmission to a third gear state from the second gear state, comprising:
disconnecting and closing a non-powershifting clutch in an opposite direction to a first direction of the second gear state.

19. The method of claim 16 further comprising upshifting the transmission from the first gear state to the second gear state.

20. The method of claim 16 further comprising having the first powershifting clutch and the second powershifting clutch be non-friction clutches.

* * * * *